United States Patent Office 3,085,093
Patented Apr. 9, 1963

3,085,093
1,6-BIS(2,2,6,6-TETRAMETHYLPIPERIDINO)-2,4-HEXADIYNE
Robert I. Meltzer, Rockaway, and Wilson B. Lutz, Florham Park, N.J., assignors to Warner-Lambert Pharmaceutical Company, Morris Plains, N.J., a corporation of Delaware
No Drawing. Filed Sept. 25, 1961, Ser. No. 140,215
1 Claim. (Cl. 260—293)

The present invention relates to new and novel piperidine derivatives having the formula

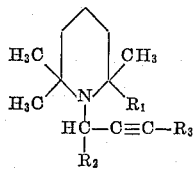

wherein $R_1$ is hydrogen or methyl, $R_2$ is hydrogen or lower alkyl and $R_3$ is hydrogen, lower alkyl or a radical of the formula

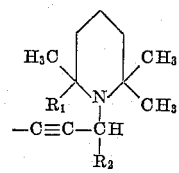

and to the non-toxic pharmaceutically acceptable acid addition and quaternary ammonium salts thereof.

The compounds of our invention having the above formula have been found to possess significant pharmacological activity in lowering blood pressure. Moreover, they are valuable intermediates in the production of other piperidine derivatives.

We have now found that those compounds of our invention having the formula

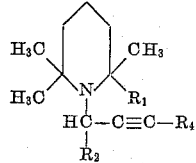

in which $R_1$ and $R_2$ are as described hereinabove and $R_4$ is hydrogen or lower alkyl may be prepared by the reaction of starting materials of the formula

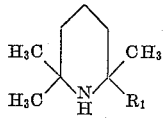

with an acetylenic bromide of the formula

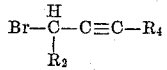

Starting materials of the above formula are known compounds which may be prepared by conventional procedures.

We have also found that the treatment of those compounds of our invention having the formula

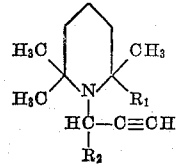

with cupric acetate in an inert solvent, for example a mixture of ethanol and pyridine, yields compounds of our invention of the formula

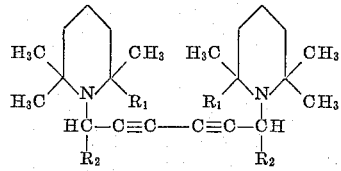

The compounds of our invention may be readily converted by conventional procedures into their pharmaceutically acceptable non-toxic acid addition and quaternary ammonium salts. Useful acid addition salts are those of such acids as maleic, oxalic, citric, acetic, methylsulfonic, p-toluenesulfonic, sulfonic, sulfuric, phosphoric, cinnamic, hydrochloric, hydrobromic and the like. Useful quaternaries are formed with such reactive halides or esters as methyl iodide, n-hexyl bromide, benzyl chloride, methyl sulfate, ethyl sulfate, methyl p-toluenesulfonate and the like.

For therapeutic use, our new and novel compounds, either as the free base or in the form of a salt, may be formulated with a conventional pharmaceutical carrier to form tablets, capsules, elixirs, solutions, suspensions, suppositories and the like.

The following examples are included in order further to illustrate our invention:

EXAMPLE 1

*1-Propargyl-2,2,6,6-Tetramethylpiperidine*

A mixture of 42.3 g. (0.3 mole) of 2,2,6,6-tetramethylpiperidine, 71.4 g. of freshly distilled propargyl bromide, 12.0 g. (0.3 mole) of magnesium oxide, 60 ml. of ethanol and 30 ml. of water is heated in a nitrogen atmosphere on the steam bath with vigorous stirring for ninety-four hours. The mixture is then acidified with hydrochloric acid and steam distilled until propargyl bromide can no longer be detected in the distillate. The receiver is then changed, the mixture made strongly basic with 10 M potassium hydroxide, and steam distillation resumed. The approximately 4.5 liters of distillate which are collected are extracted four times with ether, the total extract amounting to about 2.5 liters. This is washed with saturated sodium sulfate and the ether stripped by distillation through a 2 x 25 cm. column packed with glass helices. The oily residue is fractionated at 15 mm. to give 15 g. of material boiling at 44–90° and consisting mostly of tetramethylpiperidine. A second fraction consisting of the desired product boils at 93–95° and weighs 28.6 g. (54%) or 82.5% based on unrecovered starting material. The product crystallizes on cooling and melts at 30–34°.

Three grams of crude material is dissolved in a mixture of 15 ml. of water, 1 ml. of acetic acid and 3 ml. of 6 N nitric acid. Silver nitrate, 3.0 g. is then added and the flask swirled rapidly. A thick white precipitate suddenly separates. Conc. ammonium hydroxide is then added and the precipitate filtered. It weights about 2.0 g. when dry and a small sample explodes weakly when dropped on a hot plate. The silver salt is then treated with a solution of 6 g. of potassium cyanide in 15 ml. of water. The product is extracted into ether, the extract dried over potassium carbonate and the filtered solution treated with hydrogen chloride. A white precipitate, M.P. 207.6–208.4° weighing 1.9 g. is obtained. Two recrystallizations from 2-propanol-acetone followed by sublimation at 85–100° (0.02 mm.) yield an analytical sample of the hydrochloride salt of 1-propargyl-2,2,6,6-tetramethylpiperidine, M.P. 212–213°.

*Analysis.*—Calc.: C, 66.79; H, 10.28; N, 16.43. Found: C, 66.85; H, 10.18; N, 16.48.

EXAMPLE 2

*1,6-Bis(2,2,6,6-Tetramethylpiperidino)-2,4-Hexadiyne*

1-propargyl - 2,2,6,6 - tetramethylpiperidine (26.2 g., 0.146 mole) is dissolved in 120 ml. of a solution obtained by stirring together 15 g. of cupric acetate monohydrate, 70 ml. of dry pyridine and 70 ml. of methanol and decanting the supernate. After standing for three days at room temperature, conc. ammonium hydroxide (30 ml.) and water (60 ml.) are added and the crystals collected and washed with 5:5:1 methanol-water-ammonium hydroxide. The crude product weighs 23 g. (89%), and melts at 119–120°. Analytically pure material, M.P. 120–121°, is obtained by further recrystallization of the crude product from ethanol. If the crystals are permitted to remain in contact with the solvent for an extended period of time, a polymorphic form, M.P. 115–116° is obtained. Treatment of an ether solution of the base with hydrogen chloride gives the dihydrochloride. Recrystallization from a mixture of 1-propanol and ethyl acetate gives the analytically pure dihydrochloride of 1,6-bis(2,2,6,6-tetramethylpiperidino)-2,4-hexadiyne, M.P. 228–229°.

*Analysis.*—Calc.: C, 67.11; H, 9.86; N, 16.51. Found: C, 66.90; H, 9.94; N, 16.65.

In the foregoing examples, all temperatures are given in degrees centigrade.

It is understood that the foregoing detailed description is given merely by way of illustration and that many variations may be made therein without departing from the spirit of our invention.

Having described our invention what we desired to secure by Letters Patent is:

1,6-bis(2,2,6,6-tetramethylpiperidino)-2,4-hexadiyne.

References Cited in the file of this patent

UNITED STATES PATENTS

| | | |
|---|---|---|
| 2,498,430 | Lee | Feb. 21, 1950 |
| 2,613,208 | Van Hook et al. | Oct. 7, 1952 |

FOREIGN PATENTS

| | | |
|---|---|---|
| 103,541 | Great Britain | Feb. 1, 1917 |